Nov. 24, 1964  H. J. LARSON  3,158,134
CATTLE STANDING HEAT DETECTOR
Filed Aug. 26, 1963  2 Sheets-Sheet 1

INVENTOR.
HERBERT J. LARSON
BY
Caswell Lagaard & Wicks
ATTORNEYS

Nov. 24, 1964 H. J. LARSON 3,158,134
CATTLE STANDING HEAT DETECTOR
Filed Aug. 26, 1963 2 Sheets-Sheet 2

INVENTOR.
HERBERT J. LARSON
BY
Caswell Lagaard & Wicks
ATTORNEYS

United States Patent Office 3,158,134
Patented Nov. 24, 1964

3,158,134
CATTLE STANDING HEAT DETECTOR
Herbert J. Larson, 124 Vine St., Fergus Falls, Minn.
Filed Aug. 26, 1963, Ser. No. 304,346
5 Claims. (Cl. 119—1)

The herein disclosed invention relates to a detector by which cattle running at large in big herds, in pastures, can be identified when in heat and easily removed from the herd for breeding as by artificial insemination. Cows are classified as in standing heat when a cow submits to being mounted by another cow, this condition occurring in the early stage of a heat period. Dairy cattle, which are closely confined and controlled, are largely bred by artificial insemination. Cattle running at large in pastures, such as beef cattle, are not bred artificially because of the almost impossibility of removing a particular cow out of a heard without some identifying mark on the cow. Cows nearly all look the same and it is impossible to keep a man's eye on one cow, and know she is the right cow once she has milled with the herd.

An object of the invention resides in providing a detector which when once actuated may be reset for repeated use to show whether the cow repeats heat or is bred.

A still further object of the invention resides in constructing the detector with a flexible container containing a colored liquid and positioned on the back of the cow in heat in a position for engagement with the mounting cow.

An object of the invention resides in providing a transparent receptacle communicating with the container, disposed ahead of the same and adapted to receive the discharge from the container when pressure is applied to the same.

Another object of the invention resides in providing a partition between the container and receptacle together with valve means controlling the flow of liquid between said container and receptacle.

A still further object of the invention resides in utilizing a portion of the partition as a valve seat and utilizing a portion of the container as a valve member cooperating with said valve seat and controlling the flow of liquid between said container and receptacle.

Another object of the invention resides in disposing the valve seat at one end of the partition and in providing passageways extending through the other end and terminating in proximity to said valve seat.

A still further object of the invention resides in constructing said passageway as a groove extending longitudinally of the partition and projecting through the end and the outer surface of the same.

Other objects of the invention reside in the novel construction and arrangement of parts and in the details of construction hereinafter illustrated and/or described.

Figure 4:
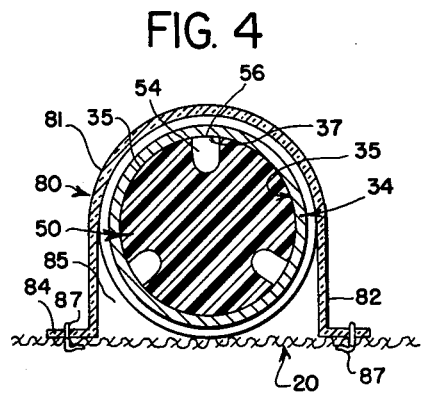
FIG. 4 is a cross sectional view taken on line 4—4 of FIG. 2, and drawn to a still greater scale.

For the purpose of illustrating the application of the invention, a portion of a cow 10 has been shown in the drawing which illustrates the back 11 of the cow and the backbone 12 running along the same. In addition, the hip bones of the trunk of the cow have been shown which are indicated by the reference numeral 13.

The invention comprises a base or supporting structure 20 on which is mounted a bubble 80. A flexible container 30 and a transparent receptacle 40 connected together by means of a cemented or welded seam 41 constitute a unit 70 which is deposed in the bubble 80 and held in position on the base 20 thereby.

The base 20 is constructed from a sheet of canvas or similar fabric material and which is adapted to conform to the surface of the cow's back on which the same is applied.

The bubble 80 is constructed with a U-shaped body 81 open at the bottom. The bubble includes a longitudinal wall structure 82 and end walls 83 and 86 closing the ends of the same. A planiform flange 84 extends about the wall structure 82 and the end walls 83 and 86 issue outwardly from the lower edges of said wall structure and walls. The bubble 80 is disposed upon the upper surface 21 of the base 20 and when so disposed provides a pocket 85 of dimensions to snugly receive the unit 70. Flange 84 may be cemented to the base 20 or secured thereto by means of stitches 87. These stitches fall short of the end wall 83 to permit of folding said end wall away from the base 20 for insertion of the unit 70 into the pocket 85 of the bubble. Bubble 80 is constructed of a material which is transparent and extremely flexible.

Figure 3:
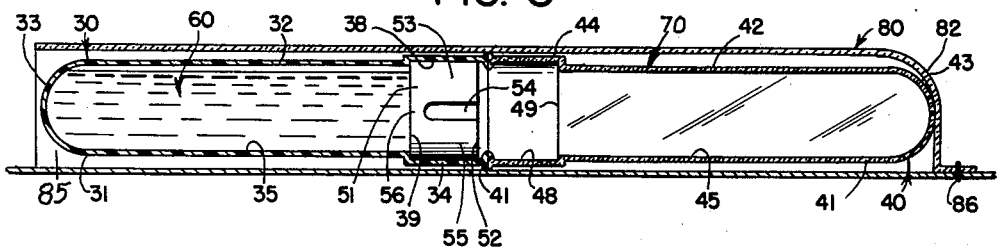
FIG. 3 is a longitudinal sectional view taken on line 3—3 of FIG. 2 and drawn to a greater scale.
Figure 7:
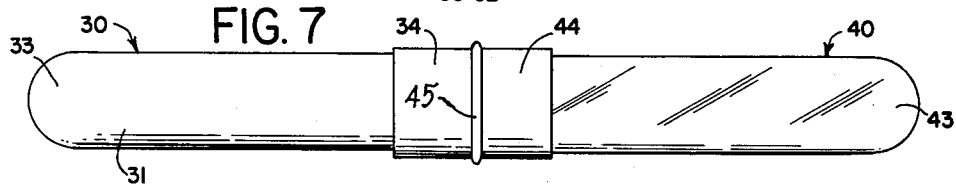
FIG. 7 is an elevational view of the unit shown in FIG. 3 and detached from the base.

The container 30 best shown in FIG. 3 is tubular in form having a body 31 constructed with a tubular wall 32 closed at one end by means of an end wall 33 and open at its other end. This construction further includes an end portion 34 which serves as a neck for the container and which has a bore 38 in the same. The bore 38 is greater in diameter than the bore 35 of wall 32 to form an outwardly facing shoulder 39 between said neck and wall.

The container 30 is constructed of polyethylene and preferably colored white so as to be perfectly opaque. The type of polyethylene employed is highly elastic and the container may be squeezed to eject the fluid within the same and also will expand in a radial direction when pressure is created within said container.

The receptacle 40 is constructed similar to the container 30 and is of the same diameter and construction. The receptacle has a tubular wall 42, an end wall 43 and a neck 44. The neck 44 has a bore 48 greater in diameter than the bore 45 of wall 42 to form a shoulder 49 therebetween. The receptacle 40, however, is constructed of clear polyethylene so as to readily display the liquid contained within the same.

Figure 5:
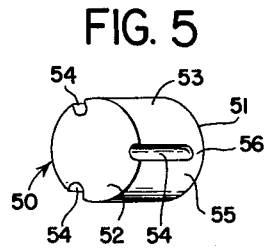
FIG. 5 is a perspective view of the partition of the invention removed from the container.
Figure 2:
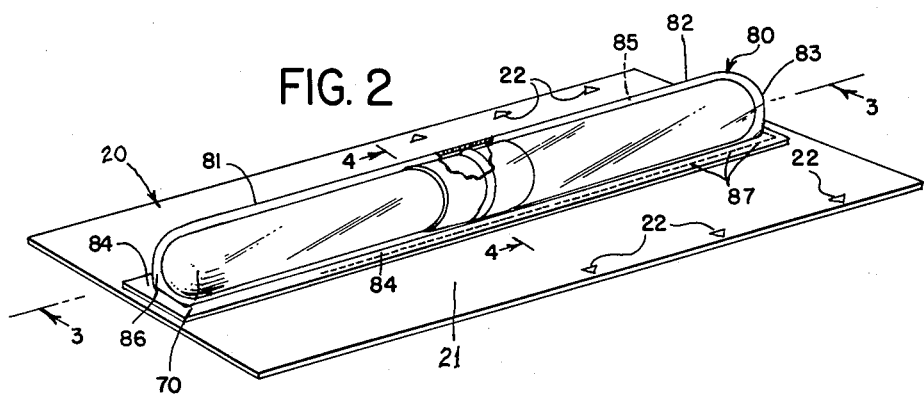
FIG. 2 is a perspective view of the detector before application to the cow.

Disposed in the neck 34 of container 30 is a partition 50 shown in detail in FIG. 5 which may also be constructed of a plastic material and which is cylindrical in form and fits snugly within the bore 35 of said neck. The partition 50 is held from inward movement into the bore 38 of wall 32 by means of the shoulder 39. The partition 50 is constructed with ends 51 and 52 and an outer portion 53 which engages the bore 38 of neck 34. The outer portion 53 is provided with grooves 54 which extend through the outer surface 55 of said partition and through the inner end 52 of the same. These grooves fall short of the other end 51 leaving areas 56 between the end 51 and the ends of said grooves. These areas serve as valve seats. The bore 38 of the neck 34 has areas 37 which overlie the areas 56 and which serve as valve members. The valve members 37 and the valve seats 56 provide valves which serve to bring the container into communication with the receptacle. When pressure is created in the container 30 the neck 34 expands and the valve members 37 leave valve seats 56 to permit the flow of fluid from the container 30 to the receptacle 40 and vice versa.

Disposed within the container 30 is a liquid 60 which is colored and preferably colored red. This liquid may contain alcohol to prevent the same from freezing or any other readily flowing liquid may be employed.

The unit 70 is formed in the following manner: The container 30 is first arranged in a vertical position with the neck 34 uppermost. The liquid 60 is then poured into the body 31 of the container through the open end thereof. Only so much liquid is used as will bring the level of the same below the shoulder 39. Partition 50 is now inserted into the bore 38 of neck 34 and is urged inwardly until it reaches shoulder 39. The receptacle 40 is next inverted and placed with the end of neck 44 resting upon the end of neck 34. With the parts so positioned the contacting portions are welded together to form the seam 41 previously referred to and which makes an air-tight connection between the receptacle and container defining a sealed capsule or enclosure. In the welding of the two parts of the unit together seam 41 forms an inwardly extending bulge which serves the same purpose as the shoulder 39, and which restrains outward movement of the partition 50 relative to container 30.

Figure 1:
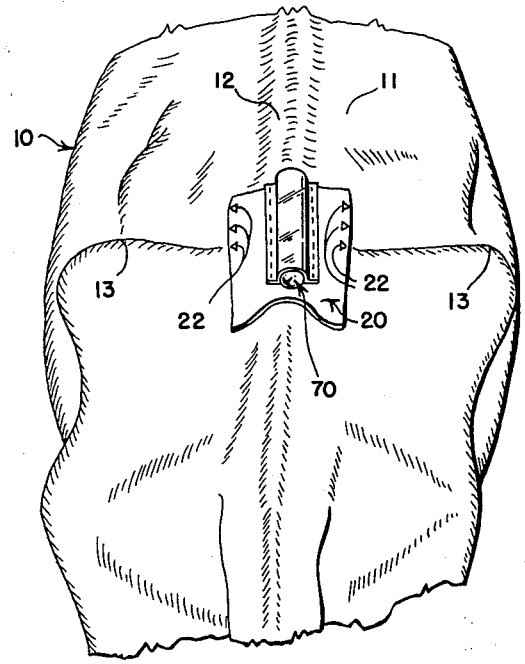
FIG. 1 is a perspective view of a portion of a cow illustrating the application of the invention thereto.

The manner of using the invention is as follows: Base 20 is first applied to the cow's back as shown in FIG. 1 by cementing the same in position. The base 20 is provided with marks 22 which indicate where the device is to be placed with reference to the hip bones 13 of the cow. These marks are for the purpose of properly applying the device to operate in conjunction with small, medium and large size cows. The base 20 is so arranged that the end wall 82 of the bubble 80 is at the forward portion of the device. Unit 70 is first held in a vertical position with the container 30 lowermost. Upon the squeezing wall 32 of the container the valve comprising the seats 56 and valve members 37 open to permit of expelling any air which may be in the said container and directing it into the receptacle 40. Upon releasing the said wall the wall expands to its normal position and withdraws any liquid which may be contained within the receptacle 40. After such liquid has been returned to said container, air is drawn from the receptacle 40 until equilibrium has been reached. The valve then becomes closed and the fluid is trapped in the container 30. The unit 70 is next inserted into pocket 85 of bubble 80 through the open end thereof. End wall 82 terminates forward movement of the unit.

When another cow mounts the cow in heat such cow's breastbone rests upon the bubble 80 at the locality of the container 30 and creates a pressure in the same which causes a portion of the fluid in container 30 to flow into receptacle 40. Any forward movement occasioned by the mounting cow is restrained by the end wall 82 of the bubble 80. Soon the pressure in both the receptacle 40 and container equalizes and flow discontinues. Upon the cow dismounting, the container 30 becomes its normal cylindrical shape and the pressure on container 30 is released and the pressure in receptacle 40 becomes higher than in container 30. Principally air and some liquid now flows back into container 30 until the pressures in the container and receptacle are again equalized. Some of the liquid, however, remains in the receptacle 40 and is visible through the transparent wall thereof to indicate that the cow is in heat. The cow in heat may then be singled out and bred in any desired manner.

Figure 8:
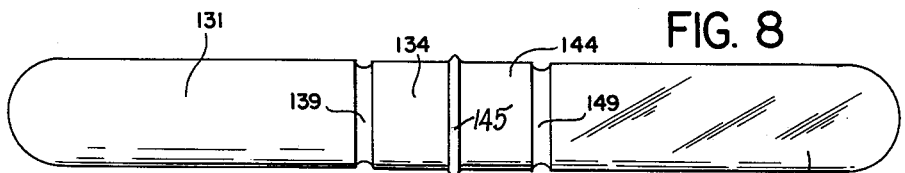
FIG. 8 is a view similar to FIG. 7 of a modification of the invention.
Figure 9:
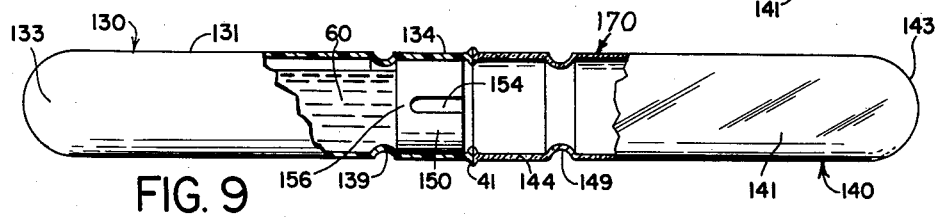
FIG. 9 is a view of the structure shown in FIG. 8 with portions broken away to show the interior construction of said structure.
Figure 6:
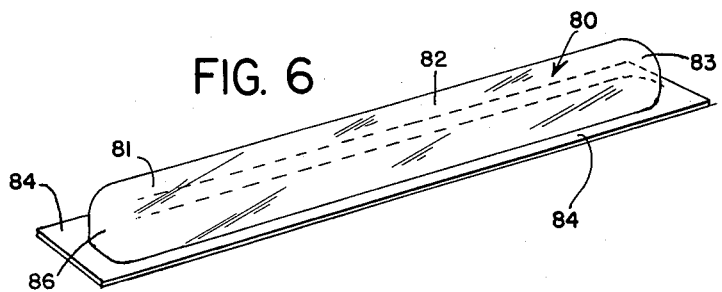
FIG. 6 is a perspective view of the bubble of the invention detached from the base.

In FIGS. 8 and 9 a modification of the invention has been shown. This form of the invention being quite similar to the form previously described will not be again described in detail and the same reference numerals will be used to designate corresponding parts, said reference numerals being preceded by the digit 1. In the form of the invention shown in the FIGS. 8 and 9 the neck 134 and 144 are of the same diameter as the bodies 131 and 141 of the other form of the invention. To hold the partition 150 in place the wall structure of the container and receptacle are formed with inwardly extending beads 139 and 149 which serve the same purpose as the shoulders 39 and 49. If desired, the bead 149 in the receptacle 140 may be omitted. The method of using this form of the invention is the same as that previously described.

The advantages of the invention are manifest. By the use of the canvas base the device can be made to conform to the irregular contour of the cow's back and be more firmly attached thereto. By the use of a bubble the unit is protected and rigidly held in position. The bubble employed offers some resistance to collapsing of the container and thus prevents accidental operation of the device in the event that the cow travels beneath branches of trees which might otherwise give a false indication. The receptacle and container being permanently sealed together, leakage of the fluid from the invention is prevented and the unit is always ready for immediate use. The device is economical to manufacture and can be built at a nominal expense. The device can be used over and over and is not readily broken or rendered inoperative.

Changes in the specific form of the invention, as herein described, may be made within the scope of what is claimed without departing from the spirit of the invention.

Having described the invention, what is claimed as new and desired to be protected by Letters Patent is:

1. In a cattle standing heat detector,
   (a) a base for attachment to the back of the cow to be bred,
   (b) a container mounted on said base and constructed from resilient material and having a tubular wall,
   (c) a colored liquid within said container,
   (d) a transparent receptacle for the colored liquid mounted on said base ahead of said container,
   (e) means for connecting said container to said receptacle for communication therebetween, and defining a sealed enclosure,
   (f) a partition between said container and receptacle,
   (g) said partition and wall forming a valve having a movable part and disposed between said container and receptacle.

2. In a cattle standing heat detector,
   (a) a base for attachment to the back of the cow to be bred,
   (b) a container mounted on said base and constructed of resilient material and having a tubular wall,
   (c) a colored liquid within said container,
   (d) a transparent receptacle for the colored liquid mounted on said base ahead of said container,
   (e) means for connecting said container to said receptacle for communication therebetween, and defining a sealed enclosure,
   (f) a partition between said container and receptacle,
   (h) said partition having a circumferential portion serving as a valve seat,
   (i) said wall being expansible and having a portion adjacent said valve seat and engageable therewith, said portion serving as a valve member,
   (j) said valve member normally engaging said valve seat and obstructing flow between said container and receptacle and upon squeezing said receptacle receding from said valve seat to pass liquid therebetween.

3. In a cattle standing heat detector,
   (a) a base for attachment to the back of the cow to be bred,
   (b) a container mounted on said base and constructed of resilient material and having a tubular wall,
   (c) a colored liquid within said container, (d) a transparent receptacle for the colored liquid mounted on said base ahead of said container,
(e) means for connecting said container to said receptacle for communication therebetween, and defining a sealed enclosure,
(f) a partition between said container and receptacle,
(h) said partition having a circumferential portion serving as a valve seat,
(i) said wall being expansible and having a portion adjacent said valve seat and engageable therewith, said portion serving as a valve member,
(j) said valve member normally engaging said valve seat and obstructing flow between said container and receptacle and upon squeezing said receptacle receding from said valve seat to pass liquid therebetween,
(k) said valve seat being disposed at one end of said partition,
(l) said partition having a recess therein extending through the opposite end thereof and up to the valve seat.

4. In a cattle standing heat detector,
(a) a base for attachment to the back of the cow to be bred,
(b) a container mounted on said base and constructed of resilient material and having a tubular wall,
(c) a colored liquid within said container,
(d) a transparent receptacle for the colored liquid mounted on said base ahead of said container,
(e) means for connecting said container to said receptacle for communication therebetween, and defining a sealed enclosure,
(f) a partition between said container and receptacle,
(j) said valve member normally engaging said valve seat and obstructing flow between said container and receptacle and upon squeezing said receptacle receding from said valve seat to pass liquid therebetween,
(k) said valve seat being disposed at one end of said partition,
(m) said partition having a longitudinal groove in the outer portion thereof extending through the opposite end of said partition and up to said valve seat.

5. In a cattle standing heat detector,
(a) a base for attachment to the back of the cow to be bred,
(b) a container mounted on said base and constructed of resilient material and having a tubular wall,
(c) a colored liquid within said container,
(d) a transparent receptacle for the colored liquid mounted on said base ahead of said container,
(e) means for connecting said container to said receptacle for communication therebetween, and defining a sealed enclosure,
(f) a partition between said container and receptacle,
(n) said partition having a number of spaced circumferential portions serving as valve seats,
(o) said wall being expansible and having portions adjacent said valve seats and engageable therewith, said portions serving as valve members, and
(p) a plurality of longitudinal grooves in the outer portion of said partition extending through the opposite end of said partition and up to said valve seat, said grooves being parallel and spaced circumferentially.

References Cited in the file of this patent
UNITED STATES PATENTS
3,076,431   Rule et al. _____ Feb. 5, 1963